(12) United States Patent
Zhou et al.

(10) Patent No.: US 11,292,670 B2
(45) Date of Patent: Apr. 5, 2022

(54) LOADING DEVICE FOR AUTOMATED GUIDED VEHICLE, AND METHOD AND SYSTEM FOR CONTROLLING THE SAME

(71) Applicant: HANGZHOU HIKROBOT TECHNOLOGY CO., LTD., Zhejiang (CN)

(72) Inventors: Chou Zhou, Zhejiang (CN); Yonghai Wu, Zhejiang (CN); Huixin Xu, Zhejiang (CN); Xiaochen Quan, Zhejiang (CN)

(73) Assignee: HANGZHOU HIKROBOT TECHNOLOGY CO., LTD., Zhejiang (CN)

(*) Notice: Subject to any disclaimer, the term of this patent is extended or adjusted under 35 U.S.C. 154(b) by 0 days.

(21) Appl. No.: 16/756,349

(22) PCT Filed: Aug. 31, 2018

(86) PCT No.: PCT/CN2018/103641
§ 371 (c)(1),
(2) Date: Apr. 15, 2020

(87) PCT Pub. No.: WO2019/085632
PCT Pub. Date: May 9, 2019

(65) Prior Publication Data
US 2021/0198049 A1    Jul. 1, 2021

(30) Foreign Application Priority Data
Oct. 30, 2017    (CN) .......................... 201711038463.7

(51) Int. Cl.
*B65G 43/08*    (2006.01)
*B07C 3/08*    (2006.01)
(Continued)

(52) U.S. Cl.
CPC ............... *B65G 43/08* (2013.01); *B07C 3/08* (2013.01); *B65G 43/10* (2013.01); *B65G 47/52* (2013.01);
(Continued)

(58) Field of Classification Search
CPC ............ B65G 47/52; B65G 43/10; B07C 3/08
See application file for complete search history.

(56) References Cited

U.S. PATENT DOCUMENTS 3,735,853 A * 5/1973 Lingg ..................... B65G 47/52
                                                           198/370.03
5,202,832 A * 4/1993 Lisy ..................... G05D 1/0236
                                                              414/343
(Continued)

FOREIGN PATENT DOCUMENTS

CN    106743340 A    5/2017
CN    107226361 A    10/2017
(Continued)

OTHER PUBLICATIONS

Li, J., CN 206325845 U, Jul. 2017, Pertinent Pages: see English language translation of the description provided herein as an NPL. (Year: 2019).*
(Continued)

*Primary Examiner* — Gene O Crawford
*Assistant Examiner* — Lester Ill Rushin
(74) *Attorney, Agent, or Firm* — Knobbe Martens Olson & Bear LLP

(57) ABSTRACT

A loading device for an automated guided vehicle, and a control method and system for the same are provided. The loading device can include a loading transport station and a control assembly. The loading transport platform can include a cargo support platform and a driver configured to drive the cargo support platform to run. The cargo support platform can be provided with a cargo entrance and a cargo exit, the cargo support platform can be configured to convey a cargo from the cargo entrance to the cargo exit, and the cargo exit can be disposed over a running passage of the vehicle. The control assembly can be connected to the driver, and the control assembly can be configured to control the driver to drive the cargo support platform to run.

20 Claims, 6 Drawing Sheets

(51) Int. Cl.
*B65G 43/10* (2006.01)
*B65G 47/52* (2006.01)

(52) U.S. Cl.
CPC .............. *B65G 2203/0216* (2013.01); *B65G 2203/042* (2013.01)

(56) References Cited

U.S. PATENT DOCUMENTS

| | | | |
|---|---|---|---|
| 6,401,936 B1* | 6/2002 | Isaacs ................... | B65G 43/08 198/367.1 |
| 10,881,164 B2* | 1/2021 | Zampieri ............. | A43B 5/0456 |
| 11,116,278 B2* | 9/2021 | Gorza ................. | A43B 5/0474 |
| 2011/0213611 A1 | 9/2011 | Rauh | |

FOREIGN PATENT DOCUMENTS

| | | | | |
|---|---|---|---|---|
| CN | 107697533 A | | 2/2018 | |
| CN | 207361279 U | | 5/2018 | |
| EP | 0050245 A1 | | 4/1982 | |
| EP | 3673761 B1 | * | 8/2021 | ........... A43B 5/0411 |
| WO | 2016/023869 A2 | | 2/2016 | |

OTHER PUBLICATIONS

AGV publications as presented by MHI, (Year: 2013).*
AGV publications as presented by Dematic (Year: 2019).*
Extended European Search Report of EP Patent Application No. 18873572.4—7 pages (dated Nov. 23, 2020).
International Search Report for PCT/CN2018/103641 dated Nov. 16, 2018.

* cited by examiner

LOADING DEVICE FOR AUTOMATED GUIDED VEHICLE, AND METHOD AND SYSTEM FOR CONTROLLING THE SAME

This application is a 371 of PCT Application No. PCT/CN2018/103641, filed Aug. 31, 2018, which claims priority to Chinese Patent Application No. 201711038463.7, filed before the National Intellectual Property Administration, PRC on Oct. 30, 2017 and entitled with "LOADING DEVICE FOR AUTOMATED GUIDED VEHICLE, CONTROL METHOD, AND CONTROL SYSTEM FOR SAME", the entire contents of which are incorporated herein by reference.

TECHNICAL FIELD

The present disclosure relates to a loading device for an automated guided vehicle, and a method and system for controlling the same.

BACKGROUND

For improving transport efficiency of cargo, an automated guided vehicle (AGV) is generally used to transport cargo in a logistics system.

In the related art, an operator may manually place a cargo onto the AGV, and the AGV may travel along a predetermined trajectory to transport the cargo to a designated destination. The process of placing the cargo onto the AGV is loading.

However, manual loading consumes more labor and time, and loading efficiency is low.

SUMMARY

According to a first aspect of embodiments of the present disclosure, a loading device for an automated guided vehicle is provided. The loading device includes a loading transport platform and a control assembly, the loading transport platform including a cargo support platform and a driver configured to drive the cargo support platform to run; wherein the cargo support platform is provided with a cargo entrance and a cargo exit, and the cargo support platform is configured to convey a cargo from the cargo entrance to the cargo exit, the cargo exit is disposed over a running passage of the vehicle; and the control assembly is connected to the driver, and the control assembly is configured to control the driver to drive the cargo support platform to run.

Optionally, the loading device further includes:

a detection assembly arranged at the cargo entrance and the detection assembly includes at least one of: a weigher, a dimension detector and a code scanner.

Optionally, the cargo support platform includes an acceleration conveyor belt, and an exit of the acceleration conveyor belt is the cargo exit.

Optionally, the cargo support platform further includes an adjacent conveyor belt adjacent to the acceleration conveyor belt; and the driver includes a driving assembly configured to drive the adjacent conveyor belt and the acceleration conveyor belt respectively.

Optionally, the adjacent conveyor belt is a buffer conveyor belt, and the cargo support platform further includes a detection conveyor belt, the detection conveyor belt, the buffer conveyor belt, and the acceleration conveyor belt are adjacently arranged in sequence, and an entrance of the detection conveyor belt is the cargo entrance; and the driver further includes a driving assembly configured to drive the detection conveyor belt or the adjacent conveyor belt is a detection conveyor belt, and an entrance of the detection conveyor belt is the cargo entrance.

Optionally, the loading device further includes a cargo identification sensor arranged on either side of each conveyor belt; and wherein the cargo identification sensor is connected to the control assembly.

Optionally, the loading device further includes a plurality of speed measurement sensors that are arranged in sequence on the running passage or on either side of the running passage along an extending direction of the running passage;

wherein each of the plurality of speed measurement sensors is connected to the control assembly, and a distance between each of the plurality of speed measurement sensors and the cargo exit is greater than a first distance threshold.

Optionally, the loading device further includes:

a vehicle identification sensor arranged on the running passage or arranged on either side of the running passage; and wherein the vehicle identification sensor is connected to the control assembly, and a distance between the vehicle identification sensor and the cargo exit is greater than a second distance threshold.

According to a second aspect of embodiments of the present disclosure, a method for controlling a loading device is provided. The method is applied for controlling the loading device as defined in the first aspect. The method includes:

acquiring a motion parameter of a target vehicle moving on a running passage; and according to the motion parameter of the target vehicle, controlling a cargo support platform of a loading transport platform to drive a cargo to be loaded to move and conveying the cargo to be loaded to the target vehicle via the cargo exit when the target vehicle moves to a position, which corresponds to the cargo exit of the cargo support platform, on the running passage.

Optionally, according to the motion parameter of the target vehicle, controlling the cargo support platform of the loading transport platform to drive the cargo to be loaded to move includes:

adjusting a conveying speed of the cargo support platform according to the motion parameter of the target vehicle, wherein the cargo to be loaded is driven to move to the cargo exit by the cargo support platform, when the cargo support platform runs at the adjusted conveying speed and the target vehicle moves to the position, which corresponds to the cargo exit, on the running passage.

Optionally, the motion parameter includes a moving position and a moving speed of the target vehicle, and adjusting the conveying speed of the cargo support platform according to the motion parameter of the target vehicle includes:

if it is detected that the target vehicle moves to a first designated position on the running passage, calculating a moving duration required for the target vehicle to move to the position, which corresponds to the cargo exit, on the running passage according to the moving speed of the target vehicle, a distance between the first designated position and the cargo exit being greater than a first distance threshold; and adjusting the conveying speed of the cargo support platform according to the moving speed and the moving duration, the adjusted conveying speed of the cargo support platform being equal to the moving speed of the target vehicle after the moving duration.

Optionally, adjusting the conveying speed of the cargo support platform according to the moving speed and the moving duration includes:

if it is detected that the target vehicle moves to the first designated position, determining a spacing distance between the cargo to be loaded and the cargo exit; and adjusting the conveying speed of the cargo support platform according to the moving duration and the spacing distance; wherein the cargo to be loaded is driven by the cargo support platform to move for a distance that is equal to the spacing distance after the cargo support platform runs at the adjusted conveying speed for the moving duration.

Optionally, before acquiring the motion parameter of the target vehicle moving on the running passage, the method further includes:

acquiring a characteristic parameter of the cargo to be loaded, the characteristic parameter including at least one of a weight, a size, and a distribution mark; and determining the target vehicle matching with the cargo to be loaded according to the characteristic parameter.

Optionally, after acquiring the characteristic parameter of the cargo to be loaded, the method further includes:

detecting whether the target vehicle with a transport parameter matching with the characteristic parameter is present according to a pre-stored transport parameter of at least one vehicle; and sending an alarm signal or moving the cargo to be loaded away from the cargo support platform if the target vehicle with the transport parameter matching with the characteristic parameter is not detected.

Optionally, determining the target vehicle matching with the cargo to be loaded according to the characteristic parameter includes:

acquiring a mark of a vehicle passing by a second designated position on the running passage, a distance between the second designated position and the cargo exit being greater than a second distance threshold;

acquiring a transport parameter of the vehicle according to the mark of the vehicle;

judging whether the transport parameter of the vehicle matches with the characteristic parameter of the cargo to be loaded; and determining the vehicle as the target vehicle if the transport parameter of the vehicle matches with the characteristic parameter of the cargo to be loaded.

Optionally, the cargo support platform includes an acceleration conveyor belt, an exit of the acceleration conveyor belt being the cargo exit; and controlling the cargo support platform of the loading transport platform to drive the cargo to be loaded to move according to the motion parameter of the target vehicle includes:

controlling the acceleration conveyor belt to drive the cargo to be loaded to move according to the motion parameter of the target vehicle.

Optionally, the cargo support platform further includes an adjacent conveyor belt adjacent to the acceleration conveyor belt; and the method further includes:

if it is detected that a cargo to be loaded remains on the adjacent conveyor belt but no cargo to be loaded remains on the acceleration conveyor belt, controlling the adjacent conveyor belt to convey the cargo to be loaded to the acceleration conveyor belt.

Optionally, the adjacent conveyor belt is a buffer conveyor belt, and the cargo support platform further includes a detection conveyor belt, the detection conveyor belt, the buffer conveyor belt, and the acceleration conveyor belt being adjacently arranged in sequence, and an entrance of the detection conveyor belt being the cargo entrance, and the method further includes:

if it is detected that a cargo to be loaded remains on the detection conveyor belt but no cargo to be loaded remains on the buffer conveyor belt, controlling the detection conveyor belt to convey the cargo to be loaded to the buffer conveyor belt.

Optionally, acquiring the motion parameter of the target vehicle moving on the running passage includes:

acquiring the motion parameter of the target vehicle by a speed measurement sensor; or receiving the motion parameter sent by the target vehicle.

According to a third aspect of embodiments of the present disclosure, a system for controlling a loading device is provided. The system includes: a running site having at least one running passage, at least one vehicle moving on the at least one running passage, and at least one loading device arranged at the running site, each of the at least one loading device being the loading device as defined in the first aspect;

wherein a cargo exit of a cargo support platform in each of the at least one loading device is disposed over one of the at least one running passage.

It is to be understood that both the foregoing general description and the following detailed description are exemplary and explanatory only and are not intended to limit the present disclosure.

BRIEF DESCRIPTION OF THE DRAWINGS

For clearer descriptions of technical solutions according to the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

The accompanying drawings herein, which are incorporated into and constitute a part of the specification, illustrate embodiments consistent with the present disclosure, and together with the specification, serve to explain the principles of the present disclosure.

DETAILED DESCRIPTION

For clearer descriptions of the objectives, technical solutions, and advantages of the present disclosure, embodiments of the present disclosure are described hereinafter in detail with reference to the accompanying drawings.

Figure 1:
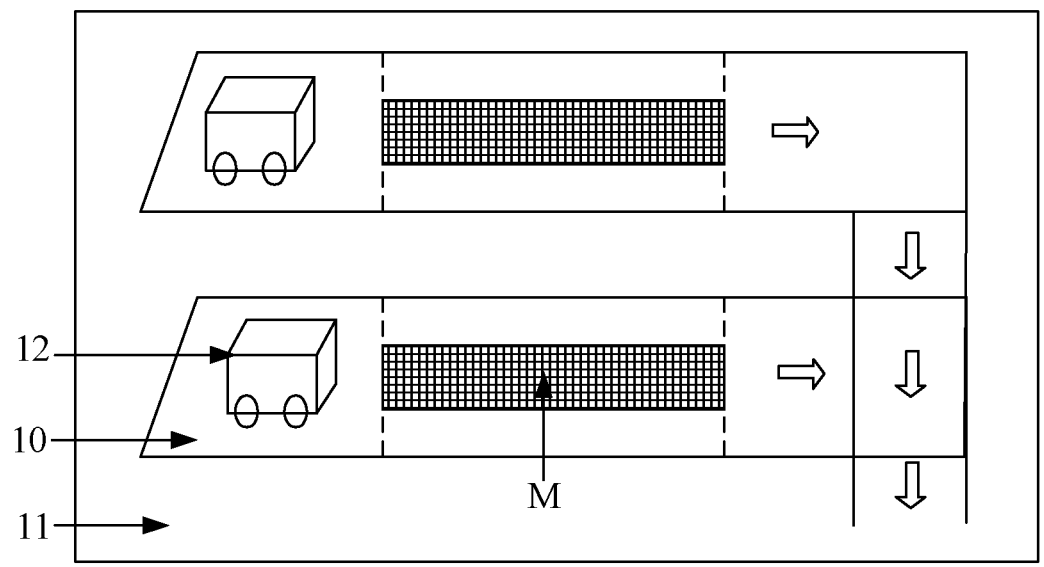
FIG. 1 is a schematic structural diagram of a loading control system according to an exemplary embodiment of the present disclosure.

An embodiment of the present disclosure provides a loading control system. As illustrated in FIG. 1, the system may include a running site 11 having at least one running passage 10, at least one vehicle 12 moving on the at least one running passage 10, and at least one loading device M arranged at the running site 11. Each of the at least one loading device M may correspond to one running passage 10, and is capable of loading cargo to the vehicle 12 moving on the running passage 10. Each of the at least one vehicle 12 may be an automated guided vehicle (AGV).

Figure 2:
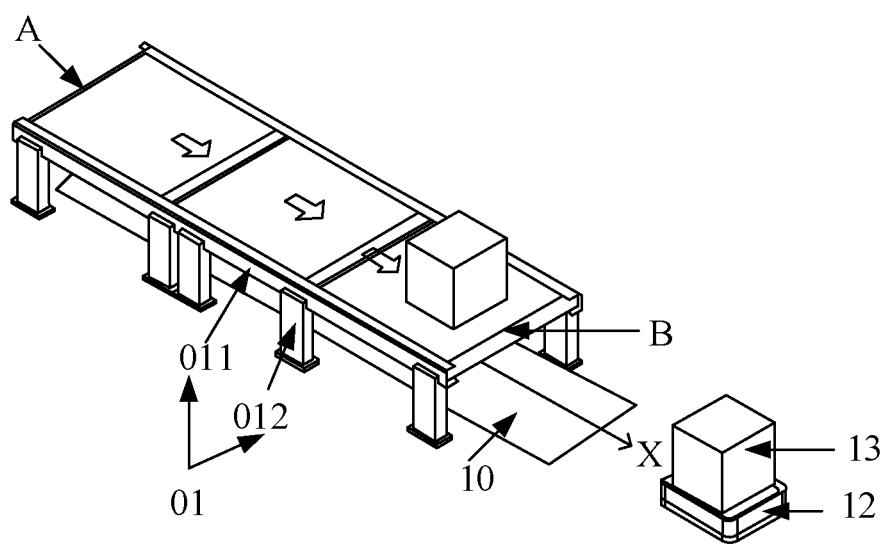
FIG. 2 is a schematic structural diagram of a loading device according to an exemplary embodiment of the present disclosure.

FIG. 2 is a schematic structural diagram of one loading device for an AGV according to an embodiment of the present disclosure. As illustrated in FIG. 2, the loading device for the AGV may include a loading transport platform 01 and a control assembly (not illustrated in FIG. 2). The loading transport platform 01 may include a cargo support platform 011 and a driver (not illustrated in FIG. 2) configured to drive the cargo support platform 011 to move.

The cargo support platform 011 is provided with a cargo entrance A and a cargo exit B. The cargo support platform 011 may convey a cargo 13 from the cargo entrance A to the cargo exit B, and the cargo exit B is disposed over the running passage 10 of the vehicle 12. The control assembly is connected to the driver and is configured to control the driver to drive the cargo support platform 011 to convey a cargo to a vehicle, such that the cargo may be automatically loaded.

The driver may be a driving motor, and the control assembly may include a primary control board and a motor control board. The primary control board is configured to control the motor control board, communicate with other devices and determine various control decisions. The motor control board is configured to control a rotation speed and a rotation direction of the driving motor.

In summary, the loading device for the AGV according to the embodiment of the present disclosure may include a loading transport platform and a control assembly. The loading transport platform may include a cargo support platform and a driver configured to drive the cargo support platform. The control assembly may control, by the driver, the cargo support platform to convey a cargo from a cargo entrance to a cargo exit, and convey the cargo to a vehicle via the cargo exit, such that the cargo is automatically loaded, and efficiency of loading cargo is effectively improved.

Optionally, as illustrated in FIG. 2, the cargo support platform 011 may be arranged over the running passage 10, and a conveying direction of the cargo support platform 011 may be consistent with an extending direction X of the running passage 10. Correspondingly, the loading transport platform 01 may further include a leg 012 supporting the cargo support platform 011. The leg 012 may be supported on an outside of the running passage 10 to avoid impacts to the normal traveling of the vehicle 12. The cargo support platform 011 is arranged over the running passage 10, such that the cargo support platform 011 may be prevented from occupying an additional space, and hence a space utilization rate of the running site may be effectively improved.

Exemplarily, as illustrated in FIG. 2, the loading transport platform 01 may include a plurality of legs 012. Each two of the plurality of legs 012 may be symmetrically arranged on both sides of the running passage 10, and each leg 012 may be fixedly connected to the cargo support platform 011, to ensure that the cargo support platform 011 is stably supported.

Figure 3:
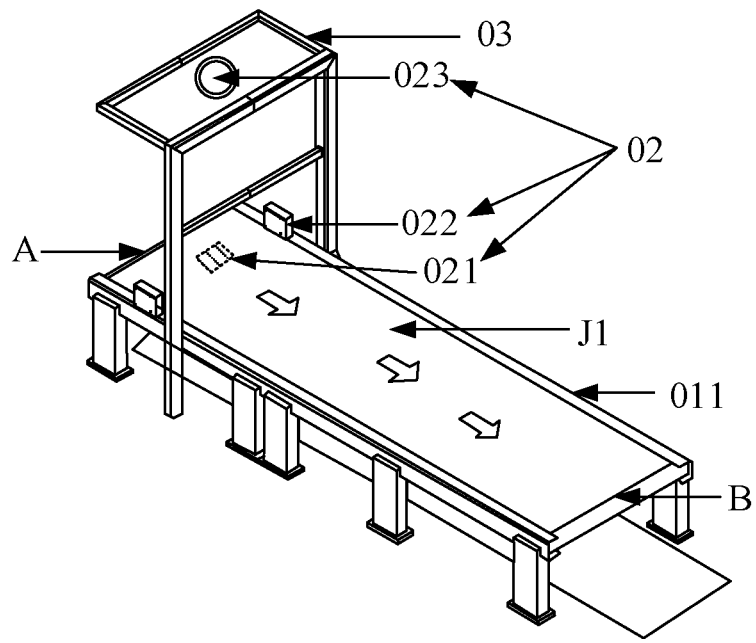
FIG. 3 is a schematic structural diagram of another loading device according to an exemplary embodiment of the present disclosure.

FIG. 3 is a schematic structural diagram of another loading device according to an embodiment of the present disclosure. As illustrated in FIG. 3, the loading device may further include a detection assembly 02 arranged at the cargo entrance A. The detection assembly 02 may include at least one of a weigher 021, a dimension detector 022, and a code scanner 023. The detection assembly 02 may be configured to acquire characteristic parameters of a cargo to be loaded, and send the characteristic parameters to the control assembly.

The weigher 021 may be configured to detect a weight of the cargo to be loaded, and the weigher 021 may be a weight sensor. As illustrated in FIG. 3, the weigher 021 may be arranged under a bearing surface of the cargo support platform 011.

The dimension detector 022 may be configured to detect a dimension of the cargo 13 to be loaded. The dimension detector 022 may be a cargo placement tooling arranged at the cargo entrance A of the cargo support platform 011. The cargo placement tooling may include two stripe-shaped structures that are arranged along the conveying direction of the cargo support platform 011. A spacing between these two stripe-shaped structures is adjustable. After the cargo to be loaded is placed between these two stripe-shaped structures, the cargo placement tooling may determine the dimension of the cargo to be loaded according to the spacing between the two stripe-shaped structures. Alternatively, the dimension detector 022 may also be a photoelectric sensor or an ultrasonic sensor or the like that is capable of directly identifying the dimension of the cargo to be loaded. As illustrated in FIG. 3, the dimension detector 022 may be arranged on both sides of the cargo support platform 011. Alternatively, the dimension detector 022 may also be arranged over the cargo support platform 011. The photoelectric sensor may be an infrared sensor.

The code scanner 023 may be configured to acquire a distribution mark of the cargo to be loaded. The distribution mark may be used to indicate a transport destination of the cargo to be loaded. For example, each cargo may be attached with a distribution cover. The distribution mark may be shown in the distribution cover. The distribution mark may be a two-dimensional code, a barcode, a character string, or the like. Correspondingly, the code scanner 023 may be a device capable of identifying the distribution mark, for example, an image sensor capable of identifying the two-dimensional code, the barcode, or the character string. In addition, the code scanner 023 may be arranged on a side of cargo support platform 011, may also be arranged over the cargo support platform 011, or may also be directly arranged on the bearing surface of the cargo support platform 011.

Exemplarily, as illustrated in FIG. 3, a stand 03 may be arranged over the cargo support platform 011, and the code scanner 023 may be arranged on the stand 03. When placing the cargo to be loaded onto the cargo support platform 011, an operator may place the side of the cargo to be loaded where the distribution mark is shown towards the code scanner 023, such that the code scanner 023 is capable of effectively scanning the distribution mark of the cargo to be loaded.

In the embodiment of the present disclosure, in a case that the detection assembly 02 includes the weigher 021, the character parameters acquired by the detection assembly 02 may include the weight of the cargo to be loaded. In a case that the detection assembly 02 includes the dimension detector 022, the character parameters acquired by the detection assembly 02 may include the dimension of the cargo to be loaded. In a case that the detection assembly 02 includes the code scanner 023, the character parameters acquired by the detection assembly 02 may include the transport destination of the cargo to be loaded.

After acquiring the characteristic parameters of the cargo to be loaded that is detected by the detection assembly 02, the control assembly may detect, according to pre-stored transport parameters of at least one vehicle 12, whether the target vehicle 12 with the transport parameters matching with the characteristic parameters is present. The transport parameters of the target vehicle 12 may include a parameter used to indicate a bearing capability of the target vehicle 12, and may further include a parameter used to indicate a transport destination of the target vehicle 12.

Optionally, the loading device may be further provided with an alarming module connected to the control assembly. The alarming module may include at least one of a buzzer and a light-emitting diode. If the control assembly fails to detect the target vehicle 12 with the transport parameters matching with the characteristic parameters, the control assembly may control the alarming module to generate an alarm, for example, a sound alarm signal, a light alarm signal, or an aural-visual alarm signal. The alarm signal may be used to prompt the operator to timely move away the cargo to be loaded, and to prevent affecting the loading of other cargo, such that efficiency of sorting the cargo is effectively improved.

Optionally, the loading device may be further provided with a sorting arm connected to the control assembly. If the control assembly fails to detect the target vehicle 12 with the transport parameters matching with the characteristic parameters, the control assembly may further control the sorting arm to directly move the cargo to be loaded away from the cargo support platform 011, such that the cargo is automatically moved away, and efficiency of sorting the cargo is effectively improved.

In the embodiment of the present disclosure, as illustrated in FIG. 3, the cargo support platform 011 may include an acceleration conveyor belt J1, and an exit of the acceleration conveyor belt J1 is the cargo exit B. The control assembly in the loading device may directly control a conveying speed of the acceleration conveyor belt J1 during controlling the cargo loading of the cargo support platform 011, such that the cargo to be loaded is conveyed from the cargo exit B to the target vehicle 12.

Figure 4:
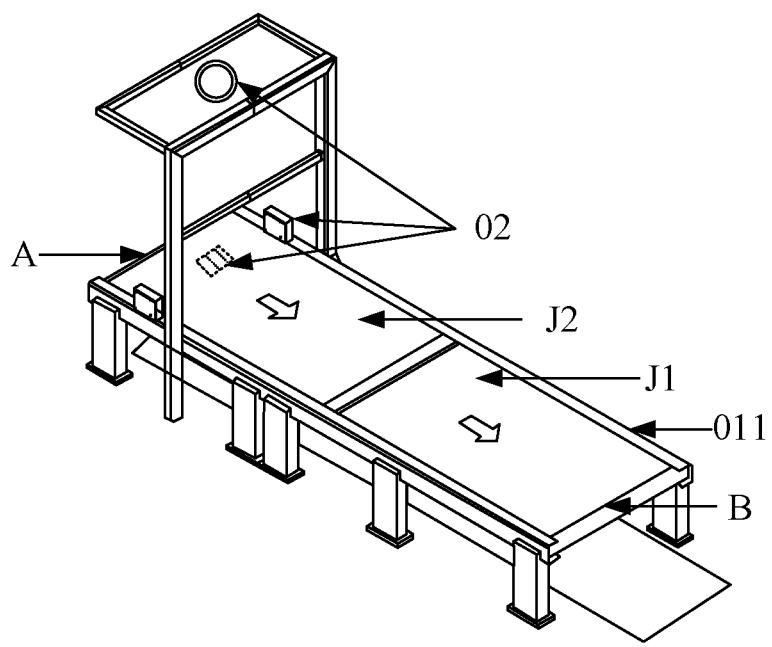
FIG. 4 is a schematic structural diagram of still another loading device according to an exemplary embodiment of the present disclosure.

Optionally, as illustrated in FIG. 4, the cargo support platform 011 may further include an adjacent conveyor belt J2 adjacent to the acceleration conveyor belt J1. Correspondingly, the driver may include driving assemblies respectively configured to drive the adjacent conveyor belt J2 and the acceleration conveyor belt J1. The control assembly may control each driving assembly to drive the corresponding conveyor belt to rotate, such that the adjacent conveyor belt J2 and the acceleration conveyor belt J1 independently rotate.

In one optional implementation, as illustrated in FIG. 4, the adjacent conveyor belt J2 may be a detection conveyor belt, and an entrance of the detection conveyor belt J2 is the cargo entrance A. The detection assembly 02 may be arranged on either side of the detection conveyor belt J2, and when a cargo to be loaded is being conveyed on the detection conveyor belt J2, the control assembly may acquire characteristic parameters of the cargo to be loaded by the detection assembly 02. During the process of acquiring the characteristic parameters, the control assembly may further control the acceleration conveyor belt J1 to convey the cargo carried thereon to the cargo exit B. In this way, steps of detection and loading may be simultaneously performed, such that efficiency of loading cargo is effectively improved.

Figure 5:
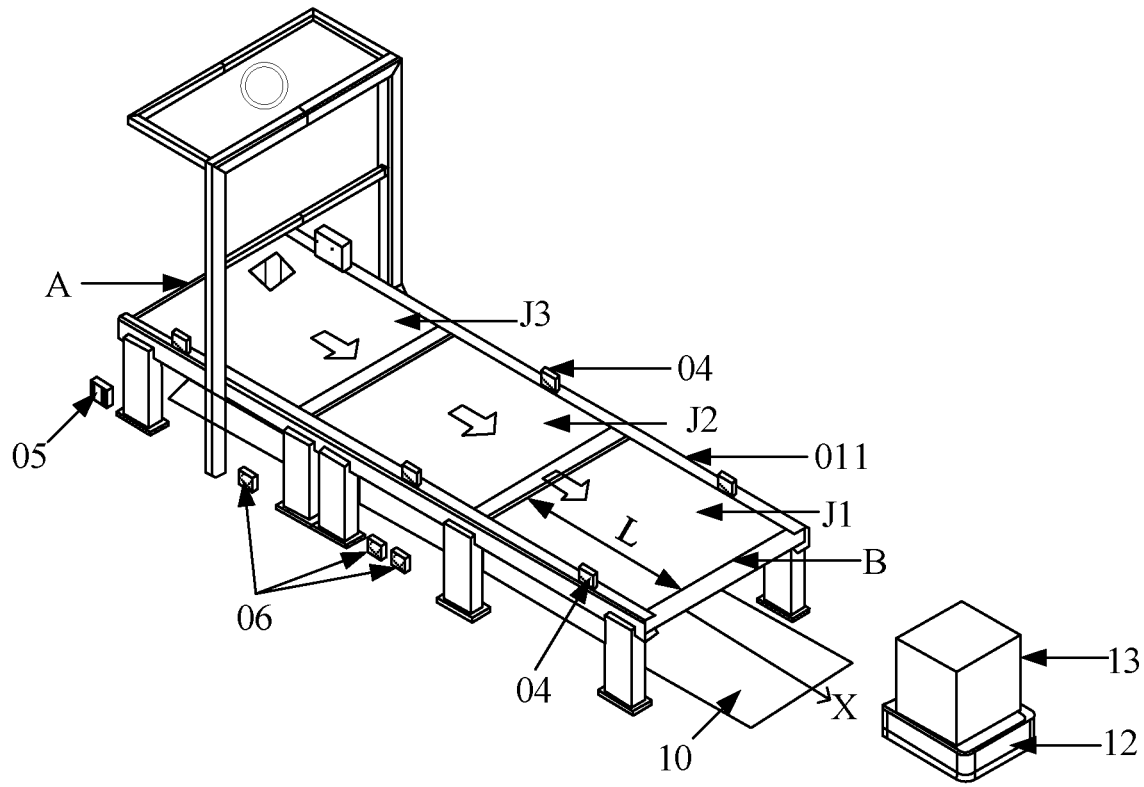
FIG. 5 is a schematic structural diagram of yet still another loading device according to an exemplary embodiment of the present disclosure.

In another optional implementation, after the control assembly determines that a target vehicle 12 matching with the cargo 13 to be loaded is present in the loading control system, the control assembly needs to acquire motion parameters of the target vehicle 12, and adjust the conveying speed of the acceleration conveyor belt J1 according to the motion parameters and this process takes some time. Therefore, for improving efficiency of loading cargo, as illustrated in FIG. 5, the adjacent conveyor belt J2 may be a buffer conveyor belt, and the cargo support platform 011 may further include a detection conveyor belt J3. The detection conveyor belt J3, the buffer conveyor belt J2, and the acceleration conveyor belt J1 may be adjacently arranged in sequence, and an entrance of the detection conveyor belt is the cargo entrance A. A plurality of such buffer conveyor belts may be arranged. Each buffer conveyor belt may be configured to buffer one cargo to be loaded, such that cargoes may be orderly loaded, and efficiency of loading cargo is improved.

In the embodiment of the present disclosure, as illustrated in FIG. 5, the loading device may further include a cargo identification sensor 04 arranged on either side of each conveyor belt. The cargo identification sensor 04 is connected to the control assembly. The cargo identification sensor 04 may be configured to detect whether a cargo remains on each conveyor belt arranged on the cargo support platform 011, and send a detection result to the control assembly, such that the control assembly may drive the corresponding conveyor belt to rotate according to the detection result.

The cargo identification sensor 04 may include any one of a pressure sensor and a photoelectric sensor. The photoelectric sensor may be an infrared sensor or a laser sensor. If the cargo identification sensor 04 includes a pressure sensor, the cargo identification sensor 04 may be arranged under a bearing surface of each conveyor belt. If the cargo identification sensor 04 includes a photoelectric sensor such as an infrared sensor or a laser sensor, the cargo identification sensor 04 may be arranged on a side of each conveyor belt, or may be arranged on a bearing surface of each conveyor belt, or may be arranged over each conveyor belt. For example, a stand may be arranged over the conveyor belt, and the cargo identification sensor 04 may be arranged on the stand.

Optionally, the loading device may further include a vehicle identification sensor 05 arranged on the running passage 10 or arranged on either side of the running passage 10. The vehicle identification sensor 05 is connected to the control assembly, and the vehicle identification sensor 05 may be configured to detect a mark of a vehicle 12, and send the detected mark of the vehicle 12 to the control assembly, such that the control assembly acquires transport parameters of the vehicle according to the received mark of the vehicle 12, and hence judges whether the vehicle 12 is a target vehicle capable of transporting the cargo to be loaded. In addition, to ensure that the control assembly has sufficient time to adjust the conveying speed of the acceleration conveyor belt J1 after identifying the target vehicle, a distance between the vehicle identification sensor 05 and the cargo exit B may be greater than a second distance threshold. The second distance threshold may be greater than a length L of the acceleration conveyor belt J1 in a conveying direction. Exemplarily, as illustrated in FIG. 5, the vehicle identification sensor 05 may be arranged at a position on the running passage 10 corresponding to the cargo entrance A of the cargo support platform 011.

In the embodiment of the present disclosure, a mark may be shown on the body of each vehicle 12, and when the vehicle 12 passes bypasses by the vehicle identification sensor 05, the vehicle identification sensor 05 may acquire and identify the mark of the vehicle 12, and send the mark of the vehicle 12 to the control assembly. Exemplarily, the mark shown on the body of each vehicle 12 may be a character string, or may also be a two-dimensional code, a barcode, or the like. The vehicle identification sensor 05 may be an image sensor capable of identifying marks, for example the image sensor may be a camera.

In the embodiment of the present disclosure, for effective loading the cargo 13, the control assembly may adjust the conveying speed of the cargo support platform 011 according to motion parameters of the vehicle 12. The motion parameters may include a moving speed and a moving position of the vehicle 12.

Therefore, as illustrated in FIG. 5, the loading device may further include a plurality of speed measurement sensors 06 which are arranged in sequence on the running passage 10 along the extending direction of the running passage 10 or arranged on either side of the running passage 10. Each speed measurement sensor 06 is connected to the control assembly, and each speed measurement sensor 06 is configured to detect a moving speed of a vehicle 12 when the vehicle 12 passes bypasses by, and send the moving speed of the vehicle 12 to the control assembly. The control assembly may determine the moving speed of the vehicle 12 according to the data sent by the speed measurement sensor 06, and may determine the moving position of the vehicle 12 according to a pre-stored position of each speed measurement sensor 06.

To ensure that the control assembly has sufficient time to adjust the conveying speed of the cargo support platform 011 according to the motion parameters after acquiring the motion parameters of the target vehicle 12, a distance between each speed measurement sensor 06 and the cargo exit B should be greater than a first distance threshold. The first distance threshold may be greater than or equal to the length L of the acceleration conveyor belt J1 in the conveying direction. In addition, the first distance threshold is less than the second distance threshold. That is, when the vehicle 12 moves on the running passage 10, the vehicle 12 needs to firstly pass by the vehicle identification sensor 05 and then pass by the plurality of speed measurement sensors 06 in sequence.

Exemplarily, as illustrated in FIG. 5, the plurality of speed measurement sensors 06 may be arranged on one side of the running passage 10, and the distances between the plurality of speed measurement sensors 06 and the cargo exit B are less than the distance between the vehicle identification sensor 05 and the cargo exit B.

In summary, the acceleration conveyor belt J1 is accelerated at a certain acceleration such that the cargo to be loaded and carried on the acceleration conveyor belt J1 is also accelerated at the acceleration. The adjacent conveyor belt J2 is adjacent to the acceleration conveyor belt J1 and the adjacent conveyor belt J2 is configured to convey the cargo 13 to be loaded to the acceleration conveyor belt J1. The detection conveyor belt J2 is configured to convey the cargo to be loaded to a detection region of the detection assembly. The buffer conveyor belt J2 is configured to buffer one cargo to be loaded, such that cargoes may be orderly loaded and efficiency of loading cargo is improved. The loading device for the AGV according to the embodiment of the present disclosure may include a loading transport platform and a control assembly. The loading transport platform may include a cargo support platform and a driver configured to drive the cargo support platform. The control assembly may control, by the driver, the cargo support platform to convey a cargo from a cargo entrance to a cargo exit, and convey the cargo to a vehicle via the cargo exit, such that the cargo is automatically loaded, and efficiency of loading cargo is effectively improved.

Figure 6:
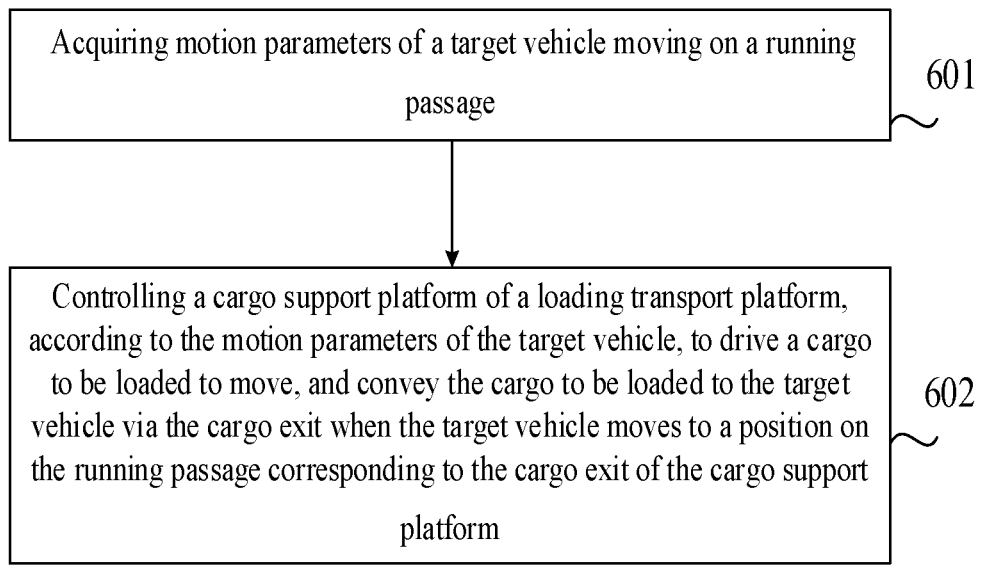
FIG. 6 is a flowchart of a method for controlling a loading device according to an exemplary embodiment of the present disclosure.

FIG. 6 is a flowchart of a method for controlling a loading device according to an embodiment of the present disclosure. The control method may be applied to drive the loading device for the AGV as illustrated in any one of FIG. 2 to FIG. 5, and the control method may be applied to the control assembly in the loading device. As illustrated in FIG. 6, the control method may include the following steps.

Step 601: motion parameters of a target vehicle moving on a running passage are acquired.

The motion parameters of the target vehicle may include a moving speed and a moving position of the target vehicle.

Step 602: according to the motion parameters of the target vehicle, a cargo support platform of a loading transport platform is controlled to drive a cargo to be loaded to move, and the cargo to be loaded is conveyed to the target vehicle via a cargo exit when the target vehicle moves to a position on the running passage corresponding to the cargo exit of the cargo support platform.

In the embodiment of the present disclosure, according to the acquired motion parameters of the target vehicle, the control assembly may control the cargo support platform to move the cargo to be loaded to the cargo exit B before the target vehicle moves to the position corresponding to the cargo exit, and to convey the cargo to be loaded to the target vehicle when the target vehicle moves to the position corresponding to the cargo exit. Optionally, the control assembly may control the cargo support platform to move the cargo to be loaded to the cargo exit after the target vehicle moves to the position corresponding to the cargo exit, and when the target vehicle moves to the position corresponding to the cargo exit, the target vehicle stops and waits for the loading of the cargo. Still optionally, the control assembly may further control the cargo support platform to synchronously move the cargo to be loaded to the cargo exit when the target vehicle moves to the position corresponding to the cargo exit, and to convey the cargo to be loaded to the target vehicle, such that it realizes that the cargo is loaded without stopping the vehicle.

In summary, in the control method for the loading device according to the embodiment of the present disclosure, the control assembly may adjust a moving speed at which the cargo support platform drives the cargo to be loaded to move according to the motion parameters of the vehicle. The control assembly may control, by the driver, the cargo support platform to convey a cargo from a cargo entrance to a cargo exit, and convey the cargo to a vehicle via the cargo exit, such that the cargo is automatically loaded, and efficiency of loading cargo is effectively improved.

Figure 7:
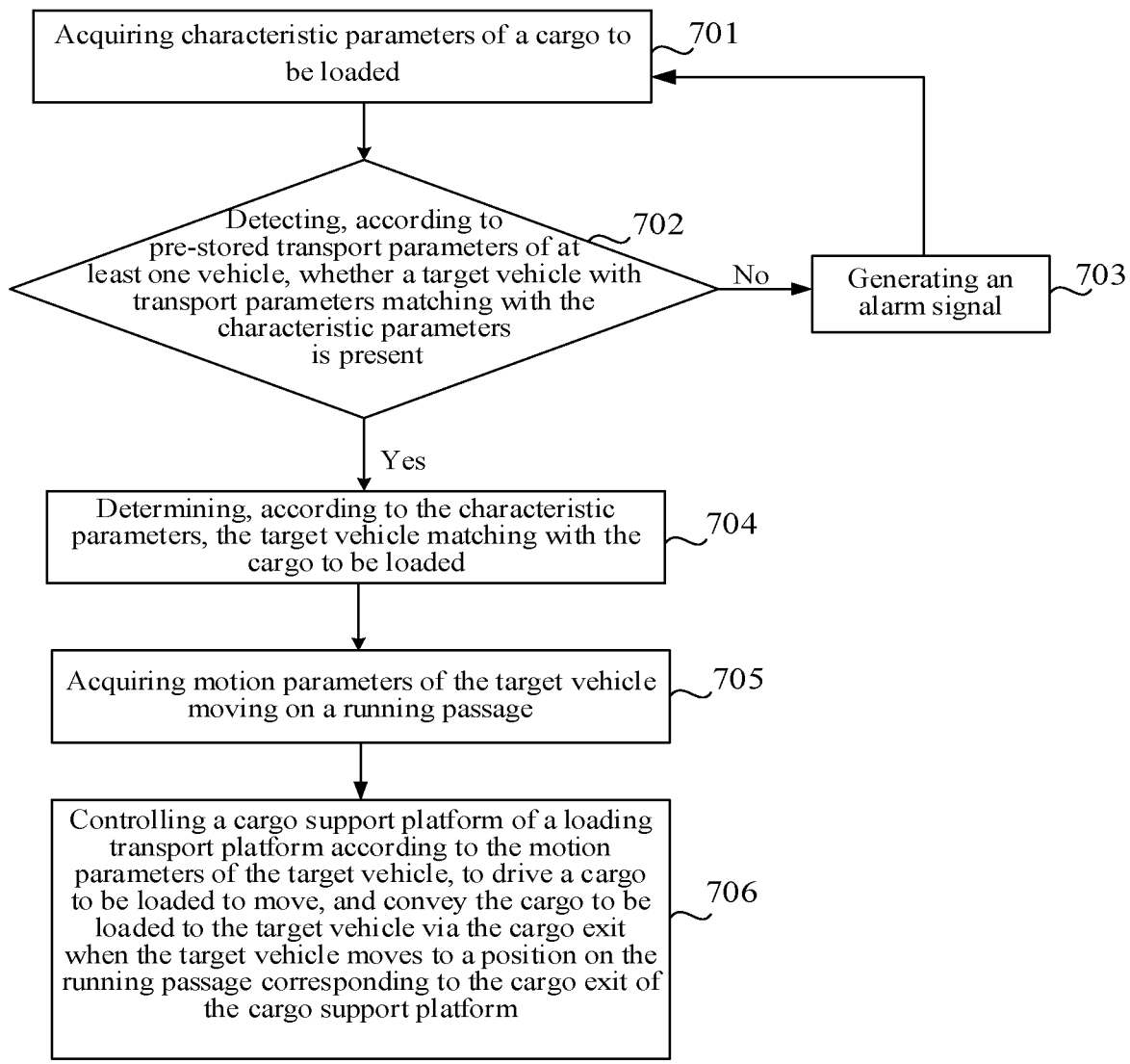
FIG. 7 is a flowchart of another method for controlling a loading device according to an exemplary embodiment of the present disclosure.

FIG. 7 is a flowchart of a method for controlling a loading device according to an embodiment of the present disclosure. The control method may be applied to drive the loading device for the AGV as illustrated in any one of FIG. 2 to FIG. 5, and the control method may be applied to the control assembly in the loading device. As illustrated in FIG. 7, the control method may include the following steps.

Step 701: characteristic parameters of a cargo to be loaded are acquired.

In the embodiment of the present disclosure, the detection assembly arranged on the cargo support platform may detect the characteristic parameters of the cargo to be loaded, and send the characteristic parameters to the control assembly. The detection assembly may include at least one of a weigher, a dimension detector, and a code scanner. Correspondingly, the characteristic parameters of the cargo to be loaded acquired by the control assembly from the detection assembly may include at least one of a weight detected by the weigher, a dimension detected by the dimension detector, and a distribution mark detected by the code scanner.

Exemplarily, assuming that the detection assembly includes a weigher, a dimension detector, and a code scanner, and the characteristic parameters of a cargo detected by the detection assembly include a weight of 6 kg, a length of 20 cm, a width of 30 cm, and a distribution mark of A, the characteristic parameters of the cargo acquired by the control assembly are that the cargo has a weight of 6 kg, a length of 20 cm, a width of 30 cm, and a distribution mark indicating a destination A.

Step 702: it is determined whether a target vehicle with transport parameters matching with the characteristic parameters is present according to pre-stored transport parameters of at least one vehicle.

In the embodiment of the present disclosure, the transport parameters of at least one vehicle in the loading control system may be pre-stored in the control assembly, the transport parameters may include a parameter which is used to indicate a bearing capability of the vehicle and/or indicate the destination of the vehicle. For example, the transport parameters of the vehicle may include at least one of a bearable weight range, a bearable dimension range, and a transport destination. After acquiring the characteristic parameters of the cargo to be loaded, the control assembly may firstly detect whether the target vehicle with the transport parameters matching with the characteristic parameters is present in the loading control system.

It should be noted that parameter types included in the transport parameters acquired by the control assembly should correspond to parameter types included in the characteristic parameters of the cargo to be loaded. For example, if the characteristic parameters of the cargo to be loaded include the weight and the dimension, the transport parameters should at least include the bearable weight range and the bearable dimension range of the vehicle.

It should be further noted that if the characteristic parameters include the distribution mark, the transport parameters matching with the characteristic parameters may mean that the transport destination in the transport parameters and the destination indicated by the distribution mark should be the same place. If the characteristic parameters include the weight or the dimension, the transport parameters matching with the characteristic parameters may mean that parameter values of the characteristic parameters are in value ranges of the corresponding transport parameters.

In the embodiment of the present disclosure, when detecting whether the transport parameters of the vehicle match with the characteristic parameters of the cargo to be loaded, the control assembly needs to detect whether each characteristic parameter of the cargo to be loaded matches with the corresponding transport parameter of the vehicle. If it is detected that various characteristic parameters of a vehicle all match with the corresponding transport parameters, the control assembly may determine a target vehicle capable of effectively bearing the cargo to be loaded is present in the loading control system, and step 703 may be performed. If it is detected that one characteristic parameter of a vehicle does not match with the corresponding transport parameter, the control assembly may determine that the vehicle is incapable of effectively bearing the cargo. If it is detected that the transport parameters of each vehicle in the loading control system do not match with the characteristic parameters of the cargo to be loaded, the control assembly may determine no target vehicle capable of effectively bearing the cargo to be loaded is present in the loading control system, and step 703 may be performed.

Exemplarily, assuming that the loading control system includes three vehicles moving on the running passage, the corresponding transport parameters of each vehicle are as listed in Table 1. Referring to Table 1, the transport parameters of the vehicle with a mark a include: a bearable weight ranging from 1 kg to 11 kg, a bearable dimension range including a length of 20 cm to 40 cm and a width of 10 cm to 40 cm, and a transport destination B.

TABLE 1

| Transport parameters of vehicle | Bearable weight range | Bearable dimension range | Transport destination |
| --- | --- | --- | --- |
| a | 1 kg to 11 kg | Length of 20 cm to 40 cm, and width of 10 cm to 40 cm | B |
| b | 1 kg to 20 kg | Length of 10 cm to 80 cm, and width of 10 cm to 20 cm | A |
| c | 1 kg to 8 kg | Length of 5 cm to 60 cm, and width of 10 cm to 80 cm | A |

It is assumed that the characteristic parameters of a cargo detected by the detection assembly include: a weight of 10 kg, a length of 50 cm, a width of 50 cm, and a distribution mark indicating destination A. The control assembly may detect that the transport parameters of each of the three vehicles do not completely match with the characteristic parameters of the cargo by comparing the characteristic parameters of the cargo with the transport parameters of the three vehicles in sequence. In this case, the control assembly may determine that no target vehicle capable of effectively bearing the cargo is present in the loading control system, and step 703 may be performed. If the control assembly detects a target vehicle with the transport parameters matching with the characteristic parameters, step 704 may be performed.

Step 703: an alarm signal is generated.

If the control assembly fails to detect a target vehicle with the transport parameters matching with the characteristic parameters, the control assembly may control an alarming module to generate an alarm signal to prompt the operator to move the cargo away for avoiding affecting loading of other cargo, such that efficiency of sorting cargo is effectively improved.

Alternatively, the loading device for the AGV may be further provided with a sorting arm, and the control assembly may be connected to the sorting arm. If the control assembly fails to detect the target vehicle 12 with the transport parameters matching with the characteristic parameters, the control assembly may further control the sorting arm to directly move the cargo to be loaded away from the cargo support platform 011, such that the cargo is automatically moved away, and efficiency of sorting the cargo is effectively improved.

Step 704: the target vehicle matching with the cargo to be loaded determining is determined according to the characteristic parameters.

If the control assembly detects that the target vehicle matching with the cargo to be loaded is present in the loading control system, it may be determined that the cargo to be loaded may be effectively loaded. Therefore, according to the characteristic parameter of the cargo to be loaded, the target vehicle matching with the cargo to be loaded may be determined from the vehicles moving on the running passage.

Figure 8:
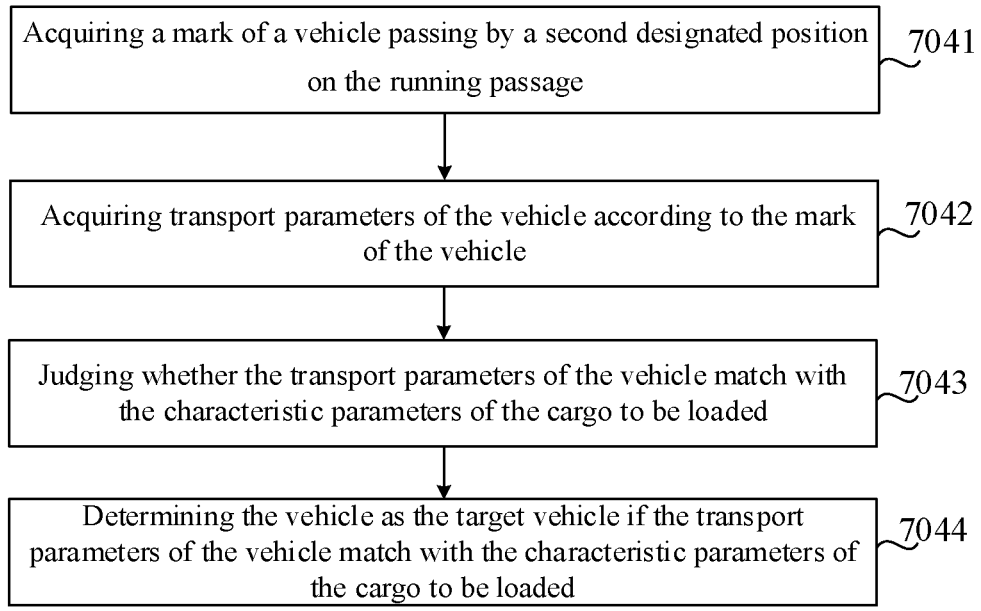
FIG. 8 is a flowchart of a method for determining a target vehicle according to an exemplary embodiment of the present disclosure.

FIG. 8 is a flowchart of a method for determining a target vehicle matching with a cargo to be loaded according to characteristic parameters of the cargo to be loaded according to an embodiment of the present disclosure. As illustrated in FIG. 8, the method for determining the target vehicle by the control assembly may include the following steps.

Step 7041: a mark of a vehicle passing by a second designated position on the running passage is acquired.

To ensure that the control assembly has sufficient time to acquire motion parameters of the target vehicle and adjust a conveying speed of the cargo support platform according to the motion parameters after determining the target vehicle, a distance between the second designated position and the cargo exit may be greater than a second distance threshold, and the second distance threshold may be greater than a length L of the acceleration conveyor belt in a conveying direction. For example, when an extending direction of the cargo support platform is parallel to the running passage of the vehicle, the second designated position may be a position where the cargo entrance of the cargo support platform is disposed.

In one optional implementation, the vehicle may be provided with a positioning module and a communication module. When the vehicle detects by the positioning module that the vehicle itself is at the second designated position, the vehicle may directly send the mark thereof to the control assembly by the communication module.

In another optional implementation, a vehicle identification sensor may be arranged at the second designated position on the running passage, and a mark is shown on the body of each vehicle. When detecting that a vehicle passes by, the vehicle identification sensor may acquire and identify the mark of the vehicle, and send the mark of the vehicle to the control assembly.

Step 7042: transport parameters of the vehicle are acquired according to the mark of the vehicle.

In the embodiment of the present disclosure, the control assembly may pre-store a corresponding relationship between the marks of the vehicles and the transport parameters thereof, and the control assembly may acquire the transport parameters of the vehicle from the pre-stored corresponding relationship according to the acquired mark of the vehicle.

Exemplarily, it is assumed that the corresponding relationship between the marks of the vehicles and the transport parameters thereof that is stored in the control assembly is as listed in Table 1. In step 7041, when the vehicle passes by the second designated position, the vehicle identification sensor identifies that the mark of the vehicle is b, that is, the mark of the vehicle passing by the second designated position that is acquired by the control assembly is b. In this case, according to the corresponding relationship as listed in Table 1, the control assembly may determine the transport parameters of the vehicle as follows: a bearable weight ranging from 1 kg to 20 kg, a bearable dimension range of a length of 10 cm to 80 cm and a width of 10 cm to 20 cm, and a transport destination A.

Step 7043: Whether the transport parameters of the vehicle match with the characteristic parameters of the cargo to be loaded is judged.

In the embodiment of the present disclosure, if the transport parameters acquired by the control assembly match with the characteristic parameters of the cargo, each of the transport parameters may be compared with a corresponding one in the characteristic parameters of the cargo to be loaded. For example, it may detect that whether a weight parameter value in the characteristic parameters of the cargo is in a bearable weight value range of the vehicle, whether a dimension parameter value of the cargo is in a bearable dimension value range and whether a destination indicated by the distribution mark of the cargo is the same as the transport destination of the vehicle.

Exemplarily, the control assembly may compare each of the characteristic parameters of the cargo to be loaded, that is, a weight of 6 kg, a length of 20 cm, a width of 20 cm, and a destination A indicated by the distribution mark, with the corresponding one in the transport parameters of the vehicle b.

In the embodiment of the present disclosure, as illustrated in FIG. 5, the cargo support platform 011 may include a detection conveyor belt J3, a buffer conveyor belt J2, an acceleration conveyor belt J1, and the like. When determining the target vehicle, the control assembly should make a judgment according to characteristic parameters of a cargo to be loaded on the acceleration conveyor belt J1. That is, the control assembly needs to judge whether the transport parameters of the vehicle match with the characteristic parameters of the cargo to be loaded that remains on the acceleration conveyor belt J1.

Step 7044: the vehicle is determined as the target vehicle if the transport parameters of the vehicle match with the characteristic parameters of the cargo to be loaded.

Exemplarily, since each of the transport parameters of the vehicle b matches with the corresponding one on the characteristic parameters of the cargo to be loaded, the control assembly may determine the vehicle with the mark b as the target vehicle.

Optionally, if the control assembly detects that the transport parameters of the vehicle do not match with the characteristic parameters of the cargo to be loaded, the control assembly may not adjust the conveying speed of the cargo support platform, and the cargo to be loaded keeps waiting on the cargo support platform. When a next vehicle passes by the second designated position, the control assembly may re-acquire the mark of the vehicle, acquire the corresponding transport parameters of the vehicle from the corresponding relationship as listed in Table 1, and continue detecting whether the vehicle matches with the cargo to be loaded. That is, the control assembly may repeat the method as illustrated in step 7040 to step 7044, until a target vehicle matching with the cargo to be loaded is determined.

Step 705: motion parameters of the target vehicle moving on a running passage are acquired.

In the embodiment of the present disclosure, after determining the target vehicle, the control assembly may acquire the motion parameters of the target vehicle, and the motion parameters may include a moving speed and a moving position of the target vehicle.

In one optional implementation, each vehicle in the loading control system may be provided with a positioning sensor, a speed measurement sensor, a communication module, and the like. The communication module in the target vehicle may report the moving position of the target vehicle detected by the positioning sensor and the moving speed of the target vehicle detected by the speed measurement sensor to the control assembly. That is, the control assembly may acquire the motion parameters automatically reported by the target vehicle moving on the running passage.

In another optional implementation, the control assembly may acquire, by a plurality of speed measurement sensors, the moving speed of the target vehicle when passing by the second designated position in real time. In addition, the control assembly may pre-store a corresponding relationship between speed measurement sensor marks and arrangement positions, and the control assembly may determine the arrangement position of the speed measurement sensor according to the mark of the speed measurement sensor reporting the moving speed, and thus determine the moving position of the target vehicle.

Exemplarily, as illustrated in FIG. 5, it is assumed that the length L of the acceleration conveyor belt J1 in the conveying direction is 10 meters (m), and three speed measurement sensors 06 are arranged in sequence at positions of 14 m, 16 m, and 18 m from the cargo exit B of the cargo support platform 011. A corresponding relationship between the arrangement positions of the speed measurement sensors 06 and the marks of the speed measurement sensors 06 is as listed in Table 2. As seen from Table 2, the mark of the speed measurement sensor 06 arranged at the position of 18 m from the cargo exit B of the cargo support platform 011 is S1.

TABLE 2

| Arrangement position of speed measurement sensor | Mark of speed measurement sensor |
| --- | --- |
| 18 m from cargo exit B of cargo support platform 011 | S1 |
| 16 m from cargo exit B of cargo support platform 011 | S2 |
| 14 m from cargo exit B of cargo support platform 011 | S3 |

It is assumed that when a target vehicle passes by, the speed measurement sensor S2 detects that the moving speed of the target vehicle is 2 meter/second (m/s), and sends the detected moving speed to the control assembly. Then after receiving the moving speed sent by the speed measurement sensor S2, the control assembly may determine, according to the corresponding relationship as listed in Table 2, the moving position of the target vehicle as 16 meters from the cargo exit B of the cargo support platform 011.

Step 706: according to the motion parameters of the target vehicle, a cargo support platform of a loading transport platform is controlled to drive a cargo to be loaded to move, and convey the cargo to be loaded to the target vehicle via the cargo exit when the target vehicle moves to a position on the running passage corresponding to the cargo exit of the cargo support platform.

In the embodiment of the present disclosure, the control assembly may adjust the conveying speed of the cargo support platform according to the motion parameters of the target vehicle. When the cargo support platform runs according to the adjusted conveying speed and the target vehicle moves to the position on the running passage corresponding to the cargo exit, the cargo support platform drives the cargo to be loaded to synchronously move to the cargo exit and conveys the cargo to the vehicle via the cargo exit, such that cargo may be loaded without stopping the vehicle.

Figure 9:
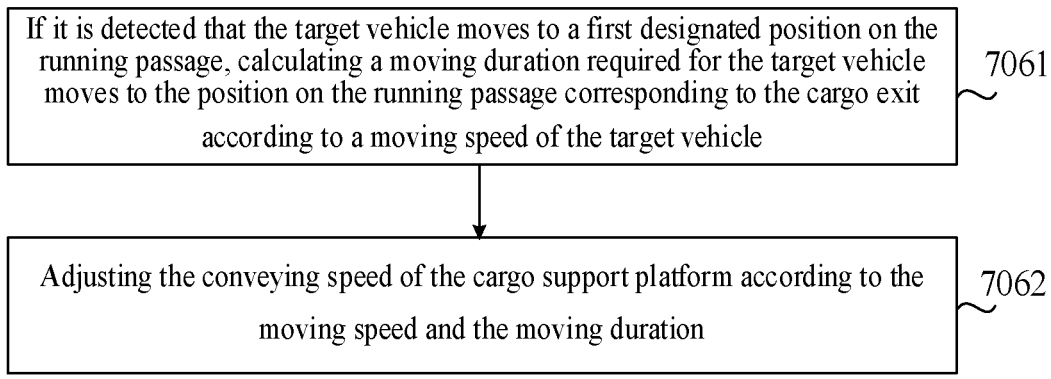
FIG. 9 is a flowchart of a method for adjusting a conveying speed of a cargo support platform according to an exemplary embodiment of the present disclosure.

Optionally, the motion parameters of the target vehicle acquired by the control assembly may include the moving position and the moving speed. FIG. 9 is a flowchart of a method for controlling a conveying speed of a cargo support platform according to motion parameters of a target vehicle according to an embodiment of the present disclosure. As illustrated in FIG. 9, the method may include the following steps.

Step 7061: if it is detected that the target vehicle moves to a first designated position on the running passage, a moving duration required for the target vehicle to move to the position on the running passage corresponding to the cargo exit is calculated according to a moving speed of the target vehicle.

In the embodiment of the present disclosure, a distance between the first designated position and the cargo exit may be greater than a first distance threshold, and the first distance threshold may be greater than or equal to the length of the acceleration conveyor belt in the conveying direction. In addition, the first distance threshold may be less than the second distance threshold. For example, the first designated position may be a position on the running passage corresponding to an entrance of the acceleration conveyor belt.

Assuming that the distance between the first designated position and the cargo exit is D, and the moving speed of the target vehicle acquired by the control assembly is V, then the control assembly may calculate a moving duration T required for the target vehicle moves to the cargo exit as T=D/V according to the moving speed V.

Exemplarily, it is assumed that the distance D between the first designated position and the cargo exit B of the cargo support platform is 14 meters. When the target vehicle passes by, the speed measurement sensor S3 at the first designated position detects that the moving speed V of the target vehicle is 2 m/s. In this case, after the speed measurement sensor S3 reports the moving speed to the control assembly, the control assembly may determine, according to the corresponding relationship as listed in Table 2, that the target vehicle moves to the first designated position. In this case, the control assembly may calculate, according to the current moving speed and moving position of the target vehicle, the moving duration T required for the target vehicle moves to the cargo exit as T=D/V=14/2=7 seconds (s).

Step 7062: the conveying speed of the cargo support platform is adjusted according to the moving speed and the moving duration.

The adjusted conveying speed of the cargo support platform may be equal to the moving speed of the target vehicle after the moving duration. In this way, when the cargo to be loaded reaches the cargo exit, the moving speed of the cargo to be loaded is equal to the moving speed of the target vehicle to prevent the cargo from falling off due to different speeds after the cargo to be loaded is conveyed to the target vehicle.

Assuming that the moving speed of the target vehicle acquired by the detection assembly is V, and the calculated moving duration is T, then the control assembly may determine an acceleration a1 of the cargo support platform according to the moving speed V and the moving duration T, and control the cargo support platform to accelerate its moving at the acceleration a1 for the moving duration T, such that the conveying speed of the cargo support platform is adjusted. The acceleration a1 may satisfy: a1=(V−V0)/T, wherein V0 denotes an initial speed of the cargo support platform. For example, when the cargo support platform includes an acceleration conveyor belt, V0 may denote an initial speed of the acceleration conveyor belt.

Exemplarily, it is assumed that the moving speed V of the target vehicle acquired by the control assembly is 2 m/s, the moving duration T is 7 s, the current cargo to be loaded remains on the acceleration conveyor belt of the cargo support platform, and the acceleration conveyor belt is in a stationary state, that is, V0 is 0. Then the control assembly may determine, according to the moving speed V and the moving duration T, that the acceleration a1 of the acceleration conveyor belt satisfies a1=(V−V0)/T=(2−0)/7≈0.28 m²/s, and may thus control the acceleration conveyor belt to rotate at an acceleration of 0.28 m²/s for 7 s, such that the speed of the acceleration conveyor belt and the cargo to be loaded and carried thereon reaches 2 m/s after 7 seconds, and thus it can be ensured that when the target vehicle moves to the cargo exit after 7 seconds, the cargo support platform may accurately load the cargo to be loaded to the target vehicle. Since the moving speed of the cargo to be loaded and the moving speed of the target vehicle are both 2 m/s during loading, the case where the cargo falls off may be prevented.

Optionally, in step 7061, if it is detected that the target vehicle moves to the first designated position, the control assembly may further determine a spacing distance between the cargo to be loaded and the cargo exit.

Correspondingly, in step 7062, when adjusting the conveying speed of the cargo support platform, the control assembly may make adjustment according to the moving duration and the spacing distance, such that after the cargo support platform runs at the adjusted conveying speed for the moving duration, the cargo support platform drives the cargo to be loaded to move at a distance that is equal to the spacing distance.

It is assumed that the control assembly calculates the moving duration required for the target vehicle to move to the cargo exit is T, and the spacing distance between the cargo to be loaded and the cargo exit is S when the target vehicle moves to the first designated position. Then, to ensure that the conveying speed of the cargo support platform after the moving duration T is equal to the moving speed V of the target vehicle, and that the distance at which the cargo support platform drives the cargo to be loaded to move within the moving duration is S, the control assembly may respectively determine, in the moving duration T, a first duration t1 for which the cargo support platform accelerates rotation at an acceleration a2 and a second duration t2 for which the cargo support platform rotates at a constant speed, wherein the first duration t1 and the second duration t2 may satisfy:

$$t1+t2=T \quad \text{Formula (1)}.$$

The acceleration a2 may satisfy:

$$a2=(V-V0)/t2 \quad \text{Formula (2)}.$$

In addition, the acceleration a2, the first duration t1, and the second duration t2 may further satisfy:

$$S=V0*t1+(a2*t1^2)/2+V*t2 \quad \text{Formula (3)}.$$

Exemplarily, it is assumed that the moving speed V of the target vehicle acquired by the control assembly is 2 m/s, the moving duration T required for the target vehicle moves to the cargo exit is 7 s, the current cargo to be loaded remains on the acceleration conveyor belt of the cargo support platform, and the spacing distance between the cargo to be loaded and the cargo exit is 8 m. The control assembly may calculate, according to Formula (1) to Formula (3), a2 as ⅓ m²/s, t1 as 6 s, and t2 as 1 s. In this case, the control assembly may control the acceleration conveyor belt to accelerate rotation at an acceleration of ⅓ m²/s for 6 s, and then rotate at a constant speed of 2 m/s for 1 s. In this way, it may be ensured that the moving speed of the acceleration conveyor belt is 2 m/s after 7 seconds, and the acceleration conveyor belt may drive the cargo to be loaded to move to the cargo exit, such that the cargo to be loaded may be accurately loaded to the target vehicle.

Optionally, referring to FIG. 3, the cargo support platform 011 may include the acceleration conveyor belt J1. Therefore, the process of adjusting the conveying speed of the cargo support platform in step 706 may be practically a process of adjusting the conveying speed of the acceleration conveyor belt J1.

Figure 10:
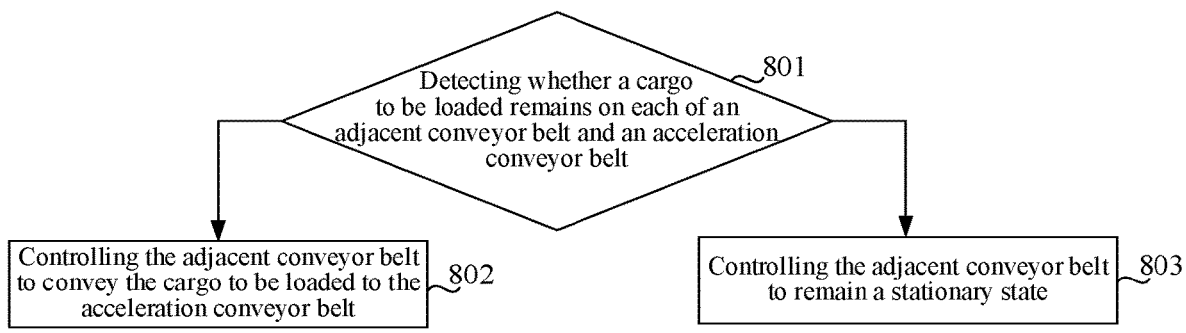
FIG. 10 is a flowchart of still another method for controlling a loading device according to an exemplary embodiment of the present disclosure.

Optionally, as illustrated in FIG. 4, the cargo support platform 011 may further include an adjacent conveyor belt J2 adjacent to the acceleration conveyor belt J1. FIG. 10 is a flowchart of still another method for controlling a loading device according to an embodiment of the present disclosure. As illustrated in FIG. 10, the control method may include the following steps.

Step 801: whether a cargo to be loaded remains on each of an adjacent conveyor belt and an acceleration conveyor belt is detected.

If the control assembly detects that a cargo to be loaded remains on the adjacent conveyor belt but no cargo to be loaded remains on the acceleration conveyor belt, step 802 may be performed; and otherwise, step 803 may be performed.

In the embodiment of the present disclosure, as illustrated in FIG. 5, a cargo identification sensor 04 may be arranged on either side of each conveyor belt. The control assembly may detect, by the cargo identification sensor 04, whether a cargo to be loaded remains on each of an adjacent conveyor belt J2 and an acceleration conveyor belt J1.

Step 802: the adjacent conveyor belt is controlled to convey the cargo to be loaded to the acceleration conveyor belt.

If the control assembly detects that a cargo to be loaded remains on the adjacent conveyor belt J2 but no cargo 13 to be loaded remains on the acceleration conveyor belt J1, the control assembly may control the adjacent conveyor belt J2 to convey the cargo 13 to be loaded to the acceleration conveyor belt J1. The operator may thus place a next cargo 13 to be loaded to the adjacent conveyor belt of the cargo support platform 011, such that the control assembly may continue detecting the characteristic parameters of the next cargo 13 to be loaded. In this way, it is ensured that detection of the characteristic parameters and loading of the cargo may be concurrently performed, and thus efficiency of loading cargo may be improved.

Step 803: the adjacent conveyor belt is controlled to remain a stationary state.

If the control assembly detects that no cargo remains on the adjacent conveyor belt J2 or a cargo to be loaded remains on the acceleration conveyor belt J1, the control assembly may control the adjacent conveyor belt J2 to remain a stationary state. In addition, if no cargo 13 to be loaded remains on the acceleration conveyor belt J1, the control assembly may further control the acceleration conveyor belt J1 to remain a stationary state too.

In one optional implementation, as illustrated in FIG. 5, if the adjacent conveyor belt J2 may be a buffer conveyor belt, the cargo support platform 011 may further include a detection conveyor belt J3. The detection conveyor belt J3, the buffer conveyor belt J2, and the acceleration conveyor belt J1 may be adjacently arranged in sequence, and an entrance of the detection conveyor belt J3 may be the cargo entrance A.

In step 801, the control assembly may detect whether a cargo to be loaded remains on each of the detection conveyor belt, the buffer conveyor belt, and the acceleration conveyor belt.

Correspondingly, the control method for the loading device may further include: if it is detected that a cargo to be loaded remains on the detection conveyor belt but no cargo to be loaded remains on the buffer conveyor belt, the detection conveyor belt is controlled to convey the cargo to be loaded to the buffer conveyor belt.

By controlling the detection conveyor belt to convey the cargo to be loaded to the buffer conveyor belt, the detection conveyor belt is capable of continuing loading and detecting for a next cargo to be loaded, such that efficiency of loading cargo is improved.

Optionally, the detection assembly in the loading device may be arranged on either side of the detection conveyor belt. Therefore, if the control assembly detects that a cargo to be loaded remains on the detection conveyor belt, the detection conveyor belt may be further configured to convey the cargo to be loaded to a detection region of the detection assembly, such that the detection assembly is capable of timely acquiring characteristic parameters of the cargo to be loaded, and sending the acquired characteristic parameters to the control assembly. After detecting a target vehicle matching with the cargo to be loaded according to the characteristic parameters, the control assembly may continue controlling the detection conveyor belt to rotate so as to convey the cargo to be loaded to the buffer conveyor belt or to accelerate conveyor belt. Optionally, if the control assembly detects that no target vehicle matching with the characteristic parameters of the cargo to be loaded is present on the running passage, the control assembly may further control the detection conveyor belt to remain in a stationary state such that the operator moves away the cargo to be loaded, or control the sorting arm to move away the cargo to be loaded.

Figure 11:
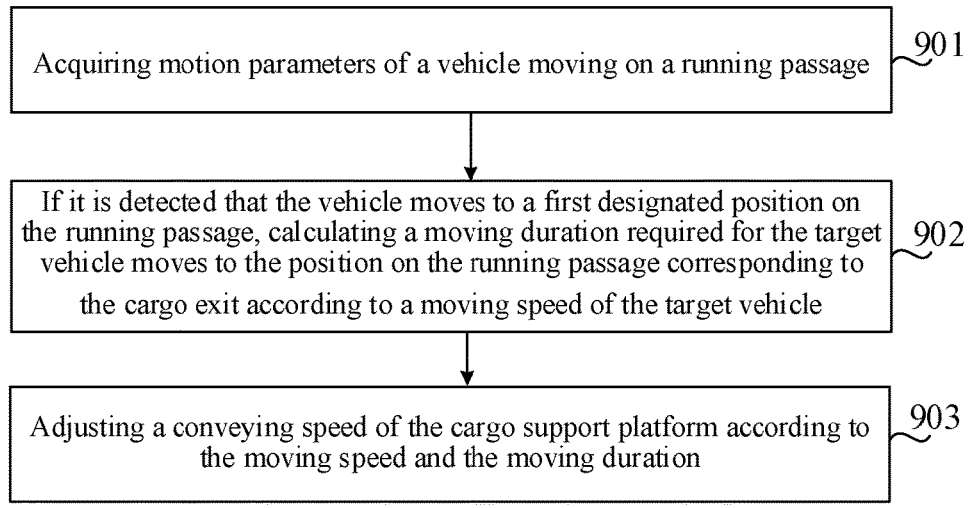
FIG. 11 is a flowchart of yet still another method for controlling a loading device according to an exemplary embodiment of the present disclosure.

FIG. 11 is a flowchart of still another method for control a loading device according to an embodiment of the present disclosure. As illustrated in FIG. 11, the control method may include the following steps.

Step 901: motion parameters of a vehicle moving on a running passage are acquired.

In the embodiment of the present disclosure, the control assembly may acquire the motion parameters of each vehicle on the running passage. The motion parameters of the vehicle may include a moving speed and a moving position of the vehicle. The process of acquiring the motion parameters of the vehicle may be referenced to step 705, which is not described herein any further.

Step 902: if it is detected that the vehicle moves to a first designated position on the running passage, a moving duration required for the target vehicle to move to the position on the running passage corresponding to the cargo exit is calculated according to a moving speed of the target vehicle.

If the control assembly detects that a target vehicle moves to the first designated position, the moving duration required for the target vehicle to move to the position on the running passage corresponding to the cargo exit may be calculated according to the moving speed of the target vehicle. The process of calculating the moving duration may be referenced to step 7061, which is not described herein any further.

Step 903: a conveying speed of the cargo support platform is adjusted according to the moving speed and the moving duration.

The process of adjusting the conveying speed of the cargo support platform according to the moving speed and the moving duration may be referenced to step 7062, which is not described herein any further.

Optionally, in the method for control the loading device according to the embodiment of the present disclosure, the sequence of the steps may be adaptively adjusted, and the steps may also be reduced or increased according to the actual needs. For example, step 701 to step 704 may be deleted according to the actual needs. That is, each vehicle in the loading control system may bear all the cargo to be loaded. Therefore, it may be unnecessary for the control assembly to determine a target vehicle matching with a cargo to be loaded. A person skilled in the art would readily envisage method variations without departing from the technical scope disclosed in the present disclosure, and these method variations shall all fall within the protection scope of the present disclosure, which are thus not described herein any further.

In summary, the acceleration conveyor belt J1 may be accelerated at a certain acceleration and thus the cargo to be loaded and carried on the acceleration conveyor belt J1 may be also accelerated at the acceleration. The adjacent conveyor belt J2 is adjacent to the acceleration conveyor belt J1 and the adjacent conveyor belt J2 is configured to convey the cargo 13 to be loaded to the acceleration conveyor belt J1. The detection conveyor belt J2 is configured to convey the cargo to be loaded to a detection region of the detection assembly. The buffer conveyor belt J2 is configured to buffer one cargo to be loaded, such that cargoes may be orderly loaded and efficiency of loading cargo is improved. In the control method for the loading device according to the embodiment of the present disclosure, the control assembly may adjust the moving speed at which the cargo support platform drives the cargo to be loaded to move, such that when the vehicle moves to the cargo exit, the cargo support platform is capable of conveying the cargo from the cargo entrance to the cargo exit, and convey the cargo to the vehicle via the cargo exit. In this way, the cargo is automatically loaded, and efficiency of loading cargo is effectively improved.

Figure 12:
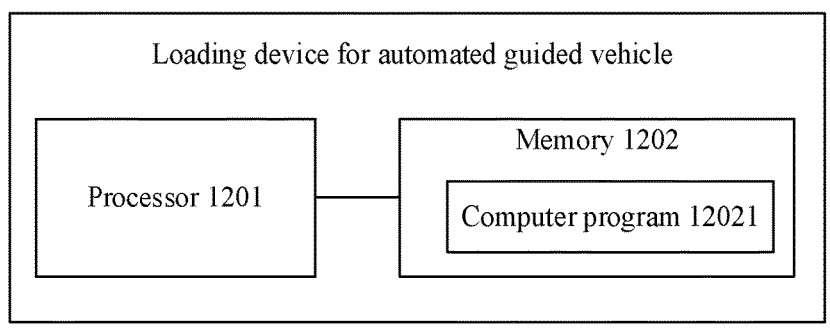
FIG. 12 is a schematic structural diagram of a loading control device according to an exemplary embodiment of the present disclosure.

FIG. 12 is a schematic structural diagram of a loading control device according to an embodiment of the present disclosure. As illustrated in FIG. 12, the loading control device may include a processor 1201 and a memory 1202. The memory 1202 may be configured to store a computer program 12021. The processor 1201 may be configured to execute the computer program 12021 stored on the memory 1202 to perform the steps in the methods according to the above method embodiments.

An embodiment of the present disclosure provides a loading control system. As illustrated in FIG. 1, the system may include a running site 11 having at least one running passage 10, at least one vehicle 12 moving on the at least one running passage 10, and at least one loading device M arranged at the running site 11. In addition, one loading device M may be arranged at each running site, and each loading device M may be the loading device as illustrated in any one of FIG. 2 to FIG. 5, and FIG. 12.

As illustrated in FIG. 5, the cargo exit B of a cargo support platform 011 in each loading device is disposed over a running passage 10, and the cargo exit of the cargo support platform 011 is higher than a cargo bearing surface of each vehicle 12, such that the cargo 13 may be effectively loaded to the target vehicle 12 when being conveyed to the cargo exit B.

Optionally, the loading control system may further include a control terminal, wherein a communication connection may be established between the control assembly in the loading device M and the control terminal. The control terminal may control the control assembly to drive the driver to operate, such that the cargo support platform 011 is driven to operate forwards to implement loading of cargo. Correspondingly, the control method for the loading device as illustrated in FIG. 6, FIG. 7, FIG. 10, or FIG. 11 may be applied to the control terminal. Optionally, the loading control device as illustrated in FIG. 12 may also be arranged in the control terminal.

An embodiment of the present disclosure provides a computer-readable storage medium. The computer-readable storage medium may be a non-volatile computer-readable storage medium. The computer-readable storage medium stores a computer program. The computer program, when being executed by a processor, may cause the processor to perform the control method for the loading device as illustrated in FIG. 6, FIG. 7, FIG. 10, or FIG. 11.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A loading device for an automated guided vehicle, comprising:
    a loading transport platform and a controller;
    wherein the loading transport platform comprises a cargo support platform and a driver configured to drive the cargo support platform to run;
    wherein the cargo support platform is provided with a cargo entrance and a cargo exit, the cargo support platform is configured to convey a cargo from the cargo entrance to the cargo exit and the cargo exit is disposed over a running passage of a vehicle;
    wherein the controller is connected to the driver and the controller is configured to control the driver to drive the cargo support platform to run; and
    wherein the loading device further comprises a vehicle identification sensor arranged on the running passage or arranged on either side of the running passage, wherein the vehicle identification sensor is connected to the controller, and a distance between the vehicle identification sensor and the cargo exit is greater than a second distance threshold; and wherein the cargo support platform comprises an acceleration conveyor belt, the second distance threshold is greater than a length of the acceleration conveyor belt in a conveying direction.

2. The loading device according to claim 1, further comprising:
    a detector arranged at the cargo entrance, the detector comprising at least one of: a weigher, a dimension detector, or a code scanner.

3. The loading device according to claim 1, wherein an exit of the acceleration conveyor belt is the cargo exit.

4. The loading device according to claim 3, wherein the cargo support platform further comprises an adjacent conveyor belt adjacent to the acceleration conveyor belt; and
    the driver is configured to drive the adjacent conveyor belt and the acceleration conveyor belt respectively.

5. The loading device according to claim 4, wherein the adjacent conveyor belt is a buffer conveyor belt, the cargo support platform further comprises a detection conveyor belt, the detection conveyor belt, the buffer conveyor belt, and the acceleration conveyor belt are adjacently arranged in sequence, and an entrance of the detection conveyor belt is the cargo entrance; and
    the driver is further configured to drive the detection conveyor belt.

6. The loading device according to claim 3, further comprising a cargo identification sensor arranged on either side of each conveyor belt; and
    wherein the cargo identification sensor is connected to the controller.

7. A loading device for an automated guided vehicle, comprising:
    a loading transport platform and a controller;
    wherein the loading transport platform comprises a cargo support platform and a driver configured to drive the cargo support platform to run;
    wherein the cargo support platform is provided with a cargo entrance and a cargo exit, the cargo support platform is configured to convey a cargo from the cargo entrance to the cargo exit and the cargo exit is disposed over a running passage of a vehicle;
    wherein the controller is connected to the driver and the controller is configured to control the driver to drive the cargo support platform to run; and
    wherein the loading device further comprises a plurality of speed measurement sensors that are arranged in sequence on the running passage or on either side of the running passage along an extending direction of the running passage; wherein each of the plurality of speed measurement sensors is connected to the controller and a distance between each of the plurality of speed measurement sensors and the cargo exit is greater than a first distance threshold; and wherein the cargo support platform comprises an acceleration conveyor belt, the first distance threshold is greater than or equal to a length of the acceleration conveyor belt in a conveying direction.

8. A method for controlling a loading device, applied for controlling a loading device for an automated guided vehicle, wherein the loading device comprises a loading transport platform and a controller; wherein the loading transport platform comprises a cargo support platform and a driver configured to drive the cargo support platform to run; wherein the cargo support platform is provided with a cargo entrance and a cargo exit, the cargo support platform is configured to convey a cargo from the cargo entrance to the cargo exit and the cargo exit is disposed over a running passage of a vehicle; and wherein the controller is connected to the driver and the controller is configured to control the driver to drive the cargo support platform to run, the method comprising:
acquiring a motion parameter of a target vehicle moving on the running passage; and
according to the motion parameter of the target vehicle, controlling the cargo support platform of the loading transport platform to drive a cargo to be loaded to move and conveying the cargo to be loaded to the target vehicle via the cargo exit when the target vehicle moves to a position, which corresponds to the cargo exit of the cargo support platform, on the running passage.

9. The method according to claim 8, wherein according to the motion parameter of the target vehicle, controlling the cargo support platform of the loading transport platform to drive the cargo to be loaded to move comprises:
adjusting a conveying speed of the cargo support platform according to the motion parameter of the target vehicle, wherein the cargo to be loaded is driven to move to the cargo exit by the cargo support platform, when the cargo support platform runs at the adjusted conveying speed and the target vehicle moves to the position, which corresponds to the cargo exit, on the running passage.

10. The method according to claim 9, wherein the motion parameter comprises a moving position and a moving speed of the target vehicle, and adjusting the conveying speed of the cargo support platform according to the motion parameter of the target vehicle comprises:
in response to detecting that the target vehicle moves to a first designated position on the running passage, calculating a moving duration required for the target vehicle to move to the position, which corresponds to the cargo exit, on the running passage according to the moving speed of the target vehicle, a distance between the first designated position and the cargo exit being greater than a first distance threshold; and
adjusting the conveying speed of the cargo support platform according to the moving speed and the moving duration, the adjusted conveying speed of the cargo support platform being equal to the moving speed of the target vehicle after the moving duration.

11. The method according to claim 10, wherein adjusting the conveying speed of the cargo support platform according to the moving speed and the moving duration comprises:
in response to detecting that the target vehicle moves to the first designated position, determining a spacing distance between the cargo to be loaded and the cargo exit; and
adjusting the conveying speed of the cargo support platform according to the moving duration and the spacing distance;
wherein the cargo to be loaded is driven by the cargo support platform to move for a distance that is equal to the spacing distance after the cargo support platform runs at the adjusted conveying speed for the moving duration.

12. The method according to claim 8, wherein before acquiring the motion parameter of the target vehicle moving on the running passage, the method further comprises:
acquiring a characteristic parameter of the cargo to be loaded, the characteristic parameter comprising at least one of a weight, a size, and a distribution mark; and
determining the target vehicle matching with the cargo to be loaded according to the characteristic parameter.

13. The method according to claim 12, wherein after acquiring the characteristic parameter of the cargo to be loaded, the method further comprises:
detecting whether the target vehicle with a transport parameter matching with the characteristic parameter is present according to a pre-stored transport parameter of at least one vehicle; and
sending an alarm signal or moving the cargo to be loaded away from the cargo support platform if the target vehicle with the transport parameter matching with the characteristic parameter is not detected.

14. The method according to claim 12, wherein determining the target vehicle matching with the cargo to be loaded according to the characteristic parameter comprises:
acquiring a mark of a vehicle passing by a second designated position on the running passage, a distance between the second designated position and the cargo exit being greater than a second distance threshold;
acquiring a transport parameter of the vehicle according to the mark of the vehicle;
judging whether the transport parameter of the vehicle matches with the characteristic parameter of the cargo to be loaded; and
determining the vehicle as the target vehicle if the transport parameter of the vehicle matches with the characteristic parameter of the cargo to be loaded.

15. The method according to claim 8, wherein the cargo support platform comprises an acceleration conveyor belt, an exit of the acceleration conveyor belt being the cargo exit, and controlling the cargo support platform of the loading transport platform to drive the cargo to be loaded to move according to the motion parameter of the target vehicle comprises:
controlling the acceleration conveyor belt to drive the cargo to be loaded to move according to the motion parameter of the target vehicle.

16. The method according to claim 15, wherein the cargo support platform further comprises an adjacent conveyor belt adjacent to the acceleration conveyor belt, and the method further comprises:
in response to detecting that a cargo to be loaded remains on the adjacent conveyor belt but no cargo to be loaded remains on the acceleration conveyor belt, controlling the adjacent conveyor belt to convey the cargo to be loaded to the acceleration conveyor belt.

17. The method according to claim 16, wherein the adjacent conveyor belt is a buffer conveyor belt, the cargo support platform further comprises a detection conveyor belt, the detection conveyor belt, the buffer conveyor belt, and the acceleration conveyor belt being adjacently arranged in sequence, and an entrance of the detection conveyor belt being the cargo entrance, and the method further comprises:
in response to detecting that a cargo to be loaded remains on the detection conveyor belt but no cargo to be loaded remains on the buffer conveyor belt, controlling the detection conveyor belt to convey the cargo to be loaded to the buffer conveyor belt.

18. The method according to claim 8, wherein acquiring the motion parameter of the target vehicle moving on the running passage comprises:
acquiring the motion parameter of the target vehicle by a speed measurement sensor; or
receiving the motion parameter sent by the target vehicle.

19. A system for controlling a loading device, comprising: a running site having at least one running passage, at least one vehicle moving on the at least one running passage, and at least one loading device arranged at the running site,
wherein the loading device comprises a loading transport platform and a controller; wherein the loading transport platform comprises a cargo support platform and a driver configured to drive the cargo support platform to run; wherein the cargo support platform is provided with a cargo entrance and a cargo exit, the cargo support platform is configured to convey a cargo from the cargo entrance to the cargo exit and the cargo exit is disposed over the running passage of the vehicle; wherein the controller is connected to the driver and the controller is configured to control the driver to drive the cargo support platform to run; and wherein the loading device further comprises a vehicle identification sensor arranged on the running passage or arranged on either side of the running passage, wherein the vehicle identification sensor is connected to the controller, and a distance between the vehicle identification sensor and the cargo exit is greater than a second distance threshold; and wherein the cargo support platform comprises an acceleration conveyor belt, the second distance threshold is greater than a length of the acceleration conveyor belt in a conveying direction.

20. The loading device according to claim 4, wherein the adjacent conveyor belt is a detection conveyor belt and an entrance of the detection conveyor belt is the cargo entrance.

* * * * *